United States Patent [19]

Sigler

[11] Patent Number: 5,139,655

[45] Date of Patent: Aug. 18, 1992

[54] INTEGRATED SYSTEM MARINE SANITATION DEVICE

[75] Inventor: James Sigler, Big Prairie, Ohio

[73] Assignee: Sealand Technology, Inc., Big Prairie, Ohio

[21] Appl. No.: 88,371

[22] Filed: Aug. 24, 1987

[51] Int. Cl.$^5$ .............................................. B01D 21/30
[52] U.S. Cl. ...................................... 210/140; 55/387; 55/279; 55/271; 210/532.1; 210/207
[58] Field of Search .................... 55/164, 182, 279, 271, 55/387, 274; 4/209 R, 219, 220; 210/916, 532.1, 603, 539, 140, 207

[56] References Cited

U.S. PATENT DOCUMENTS

| | | | |
|---|---|---|---|
| 561,381 | 6/1896 | Ellis | 4/220 |
| 2,092,925 | 9/1937 | Lithgow | 55/279 |
| 3,085,719 | 4/1963 | Weber | 422/5 |
| 3,925,827 | 12/1975 | Wagenhals | 422/5 |
| 4,063,315 | 12/1977 | Carolan et al. | 4/DIG. 19 |
| 4,268,285 | 5/1981 | Mason | 55/271 |
| 4,391,704 | 7/1983 | Anderson | 210/539 |
| 4,701,193 | 10/1987 | Robertson et al. | 55/274 |
| 4,826,513 | 5/1989 | Stackhouse et al. | 55/316 |

OTHER PUBLICATIONS

Kirk-Othmer, *Encyclopedia of Chemical Technology*, 1978, vol. 1, pp. 644 & 654-657.

Kirk-Othmer, *Encyclopedia of Chemical Technology*, 1981, vol. 16, p. 202.

*Primary Examiner*—Bernard Nozick
*Attorney, Agent, or Firm*—Nixon & Vanderhye

[57] ABSTRACT

A sanitation system, particularly for use in vehicles such as marine vessels (boats), trains, planes, etc. Into a holding tank with a sloping bottom containing sewage from a toilet system, such as a vacuum toilet system, about eight ounces of deodorant chemical is automatically injected into the tank approximately every 48 hours. This effectively controls odors while minimizing chemical consumption. A gas vent from the tank passes through a vent filter having a first type of activated charcoal effective against $H_2S$, and a minor amount of activated charcoal effective against amino acid gaseous compounds, the vent filter removing odors. A tank cap in the top of the cap supports "high" and "full" level indicator switches and allows for the injection of the chemical and the gas vent. A tank cleaning device comprising a piece of surgical tubing with a nozzle at its free end and connected to a source of liquid under pressure can also be utilized. In use, the nozzle impacts the tank walls while spraying liquid in it to effect cleaning. A control module and control panel provide for an indication of the tank liquid level, control of the injector pump, and control of the discharge pump which discharges sewage from the holding tank.

11 Claims, 4 Drawing Sheets

INTEGRATED SYSTEM MARINE SANITATION DEVICE

BACKGROUND AND SUMMARY OF THE INVENTION

For many vehicles having toilet systems, particularly marine vessels, it is desirable to provide effective and relatively large holding capacity for the sewage, which may be ultimately legally discharged. Such tanks, however, typically have nauseating odors associated therewith, have breakdowns in equipment, and in general can be a nuisance that can render a very expensive craft unpleasant to operate. According to the present invention, a system, and individual component parts thereof, are provided which allow effective odor control of the holding tank over significant periods of time, to allow practical on-board retention until discharge is legally permissible, without odor problems.

According to the present invention, a holding tank is provided with a gas vent in the top thereof through which odoriferous gases pass, such as—in particular—hydrogen sulfide and amino acid odors. An in-line filter, comprising a tubular housing with end terminations and retaining means adjacent each end for retaining activated carbon within the housing, is provided. The filter does not offer significant resistance to air flowing therethrough, and contains two different types of activated carbon, a first (about 90%) particularly effective against hydrogen sulfide, and a second particularly effective against amino acid gaseous compounds.

Additionally, odor control chemical is injected into the tank. It has been found, according to the present invention, that maximum odor control with a minimum amount of chemical usage is provided when a small and predetermined amount of chemical is injected into the tank on a periodic basis. The chemical is injected after a significant amount of bacteria build-up but before exponential growth of the bacteria. A chemical injection pump remote from the tank provides for the injection.

In order to facilitate odor control and tank discharge operations, a tank cap is provided in the top of the tank, the cap in removable sealing relationship with the tank top. The odor vent and chemical injection take place through the tank cap, and additionally the tank cap has operatively mounted thereon a pair of level indicator switches, such as "Reed" switches, one indicating a "high" level of liquid in the tank, and the other indicating that the tank is "full." The tank cap also can be provided for other purposes, such as allowing the passage of tank cleaning apparatus therethrough. The level switches are operatively connected to a control panel, which also controls the chemical injection, and controls the discharge pump.

A discharge pump is operatively connected adjacent the bottom of the tank, at a point where a downwardly sloping bottom wall of the tank is at its nadir. A downwardly disposed flexible conduit loop connects the bottom portion of the tank to the discharge pump and an upwardly extending conduit loop connects the discharge pump to a nozzle discharge system which is below the waterline of a marine vessel. The top of the upwardly extending loop is at least a foot above the waterline of the vessel.

The tank, hoses and other components are selected so that they do not pass odors. Such components, such as hoses that will not pass odors, may be purchased from SeaLand Technology, Inc., of Big Prairie, Ohio.

A tank cleaning device which may be utilized according to the invention comprises a piece of flexible tubing, such as surgical tubing, connected at a first end thereof, to or adjacent a wall (preferably the top wall) of the tank and in communication with a source of fluid (preferably liquid) under high pressure. The free end of the tubing has a nozzle associated therewith, the nozzle having significant mass and also significantly restricting the flow of fluid therethrough and thereby increasing its velocity. The tube has sufficient length so that when fluid under pressure is supplied to the interior thereof, the tube will thrash wildly within the tank, and dispense fluid in the tank while the nozzle impacts against the tank walls.

It is a primary object of the present invention to provide a vehicle toilet system holding tank assembly or the like that has excellent odor control. This and other objects of the invention will become clear from an inspection of the detailed detailed description of the invention, and from the appended claims.

DETAILED DESCRIPTION OF THE DRAWINGS

Figure 1:
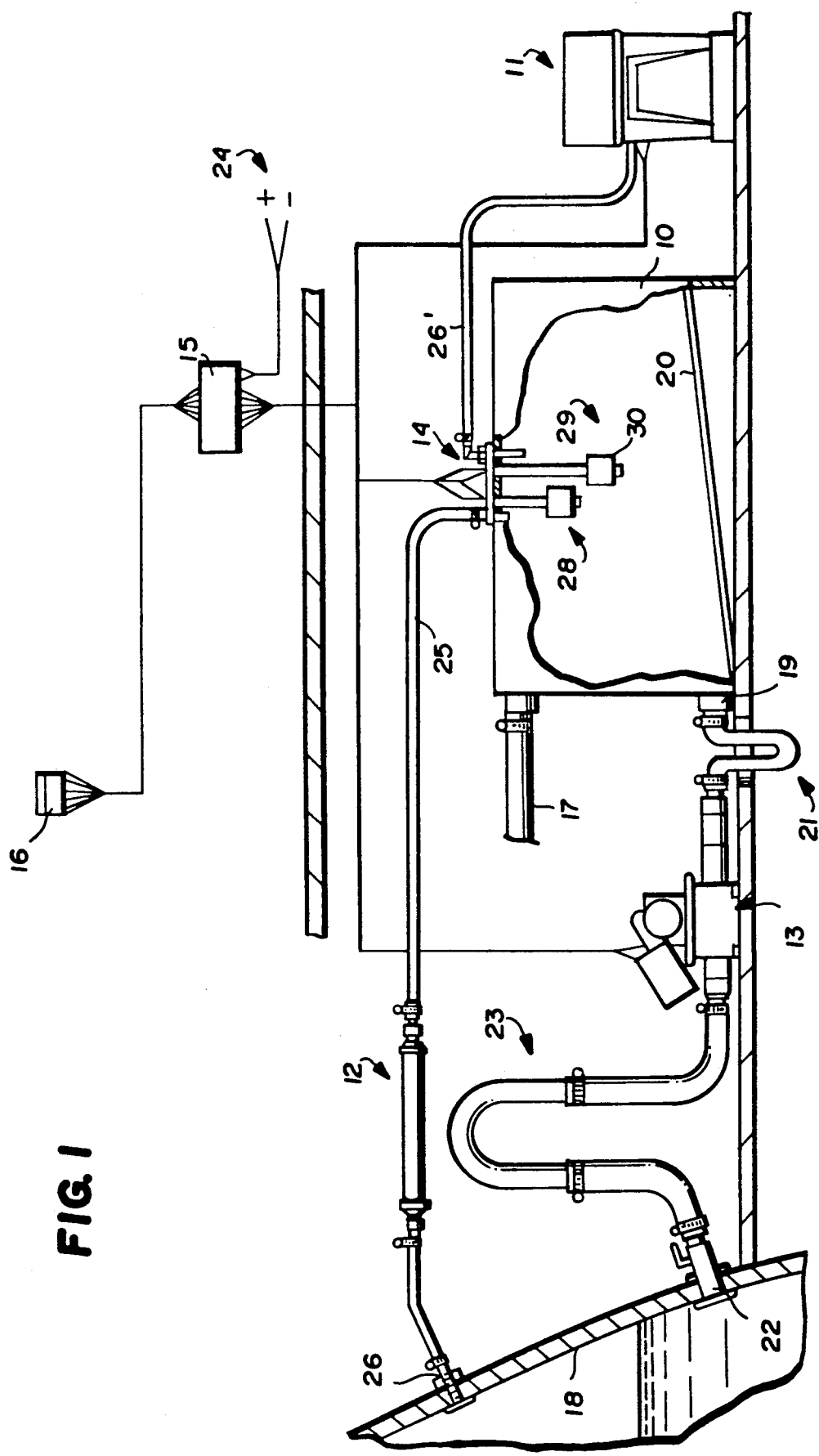
FIG. 1 is a side schematic view of an exemplary holding tank assembly for a vessel toilet system, shown particularly in a marine vessel.

An exemplary holding tank assembly according to the present invention is illustrated schematically in FIG. 1. The major components of the system include the holding tank 10, deodorant chemical container injection unit 11, vent filter 12, discharge pump 13, a tank cap 14, a control module 15, and a control panel 16. The discharge conduit 17 from the toilets on the vehicle (in this case, a boat having a hull 18) with which the assembly is utilized passes into the tank 10, and an outlet conduit 19 is provided at the bottom of the tank. Preferably the bottom wall 20 of the tank slopes downwardly toward the discharge conduit 19 so that nothing accumulates and remains stagnant within the tank 10.

The discharge pump 13, which may be of any suitable type but is preferably the type sold by SeaLand Technology, Inc. of Big Prairie, Ohio, and having a pump and a reciprocal pumping element connected the pump housing by a bellows or rolling diaphragm, is connected to the tank outlet 19 via a conduit having a downwardly extending loop—as indicated at 21 in FIG. 1. A discharge nozzle 22 passes through the hull 18 of the vessel below the waterline, and the discharge pump is connected to the discharge nozzle 22 utilizing upwardly directed conduit loop 23. The very top portion of the loop 23 preferably is at least a foot higher than the waterline, and more desirably, at least two feet higher. The electrical control wires for operating the discharge pump 13 pass to the control module 15, which is connected to a source of electrical energy 24, and the control module 15, in turn, is connected to the control panel 16.

A gas vent is provided in the holding tank 10 through the tank cap 14 at the top of the tank 10, and is connected via a ⅜" vent hose 25 to the vent filter 12 at one end thereof, the other end of the vent filter 12 being connected to a vent fitting 26, which passes through the hull 18 above the waterline. Deodorant chemical may be that sold under the trademark "WasteBeGone" TM biodegradable deodorant with a detergent additive, sold by SeaLand Technology, Inc. of Big Prairie, Ohio. The chemical passes from the container/injection unit 11 through a ⅜" inside diameter hose 26' to the tank cap 14.

Also provided on the tank cap 14 are first and second level indicators 27, 28, respectively. The level indicators include cylindrical portions, such as the portion 29, extending downwardly from the tank cap 14 and containing a Reed switch therein. A float portion 30 moves up and down on the cylinder 29 in dependence upon the level of liquid in the tank 10, and the float 30 has a permanent magnet associated therewith for actuating the Reed switch. The electrical wires from the level controls 27, 28 pass through the tank cap 14 to the control module 15 and are controlled by the control panel 16. The wires for the injection control pump also pass through the control module 15 and are controlled by the panel 16.

Figure 2:
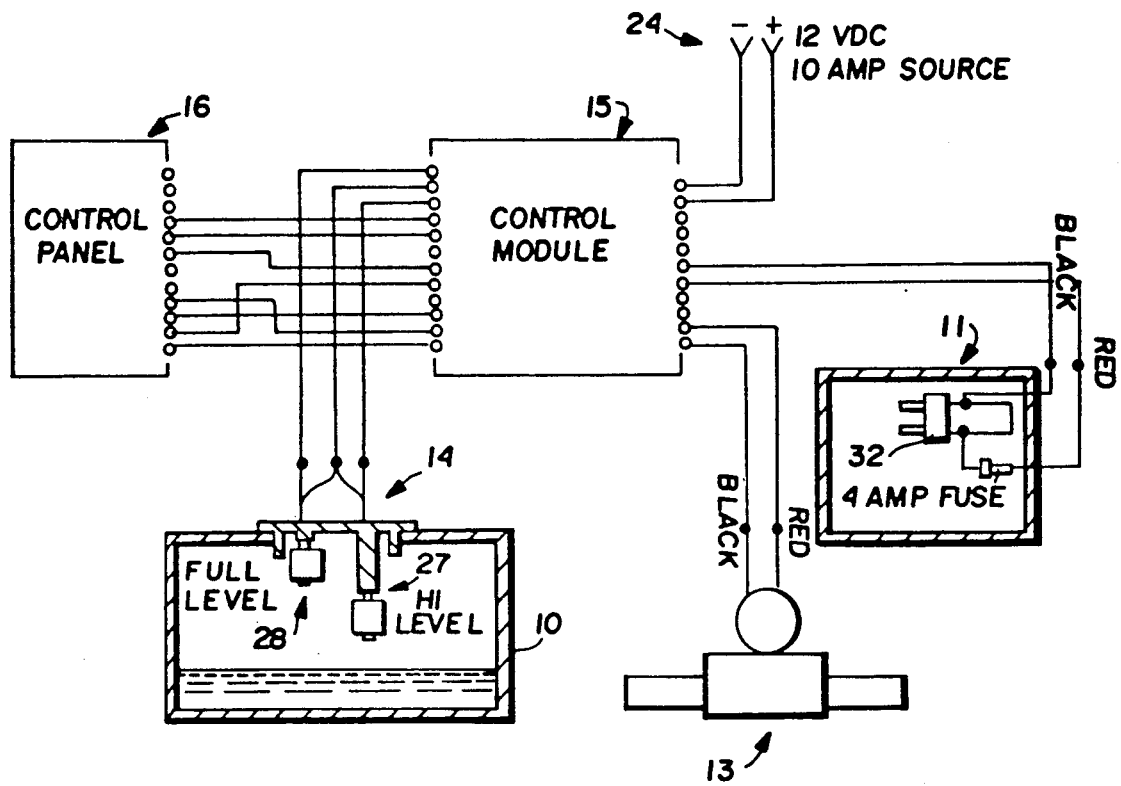
FIG. 2 is a typical wiring diagram illustrating the interconnection between component parts of the system of FIG. 1.

FIG. 2 illustrates a typical wiring diagram. Of course, a suitable timer is provided associated with the control module 15 for controlling periodic operation of the chemical injection pump 32 disposed in the unit 11.

Figure 3:
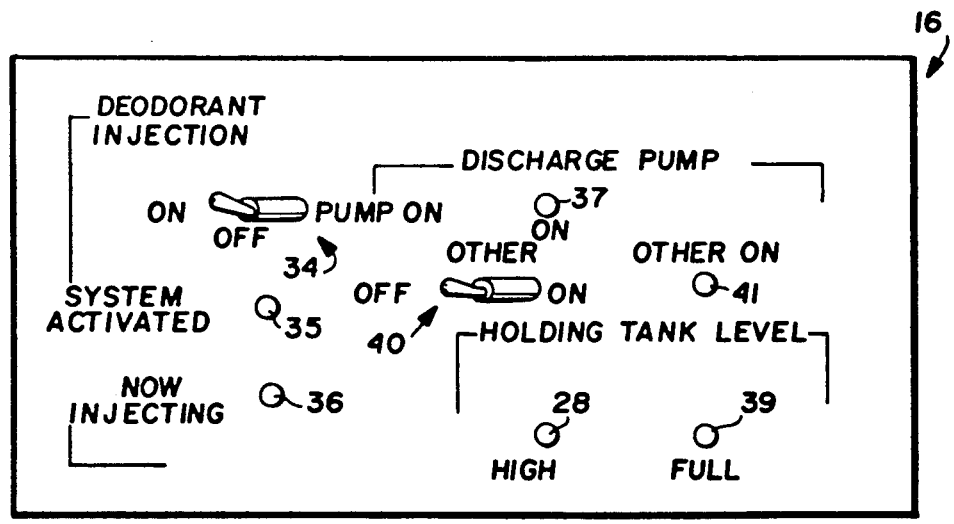
FIG. 3 is a front view of the control panel of the assembly of FIG. 1.

The control panel 16 is seen in FIG. 3. It includes a three-position switch 34. When the switch 34 is in the central "off" position, both discharge pump 13 and the chemical injection pump 32 (controlled by a timer) are off. When it is in the "on" position, as illustrated in FIG. 3, then the deodorant injection system is activated and the pump 32 will be periodically activated to introduce a desired amount of chemical into the tank 10. An indicator light 35 indicates that the deodorant injection system is activated, and the light 36 indicates when an actual injection of deodorant chemical into the tank 10 is taking place.

When the switch actuator 34 is in the righthandmost position, then the discharge pump 13 is on. The indicator light 37 indicates that the discharge pump 13 is working. Because the single switch 34 provides for deodorant injection and discharge pumping, it is impossible to have the mistaken situation where chemical is being injected while the discharge pump is running.

Indicator 38 is responsive to float switch 27, and indicates that the level in the holding tank 10 is high.

Indicator light 39 is responsive to float switch 28 and indicates that the tank is full and that discharge should be effected at the earliest opportunity. Another electrical switch 40, or the like, with associated indicator light 41, also may be provided for other functions, such as for a cleaning system for cleaning the inside of the tank.

It has been found, according to the present invention, that optimum odor control with a minimum amount of use of deodorant chemical can be achieved when a predetermined amount of deodorant chemical is injected into the tank at predetermined time intervals. It is desirable to let the bacteria level build up somewhat before injecting the chemical, but not allow it to build up to the point where exponential growth occurs. It has been found effective to introduce between about 6–10 ounces of undiluted "WasteBeGone" TM chemical into the tank 10 every 24 to 72 hours. An optimum has been found to be approximately an 8-ounce injection of chemical approximately every 48 hours.

Figure 4:
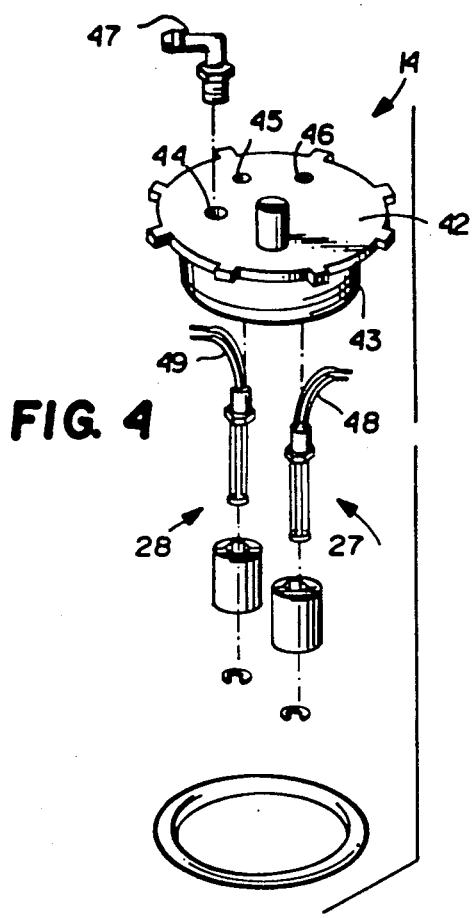
FIG. 4 is a top perspective view of a tank cap of the assembly of FIG. 1.

FIG. 4 illustrates the holding tank cap 14 and associated components. The cap comprises a cap body 42 having an exteriorly threaded collar 43 depending therefrom, and which cooperates with an interiorally threaded portion in the top wall of the tank. A plurality of openings 44 through 46 are provided through the body 42. For example, openings 44 and 46 can cooperate with an elbow, such as elbow 47, for connection to the vent filter 12 and chemical container/injection unit, respectively, while the electrical wires 48, 49 from the float switches 27, 28 pass through the opening 45. An 0-ring is disposed between the body 42 in the top wall of the tank 10 to provide a sealing engagement of the tank cap 14 to the tank 10. Other passageways may be provided in the tank cap 14 for other devices.

Figure 5:
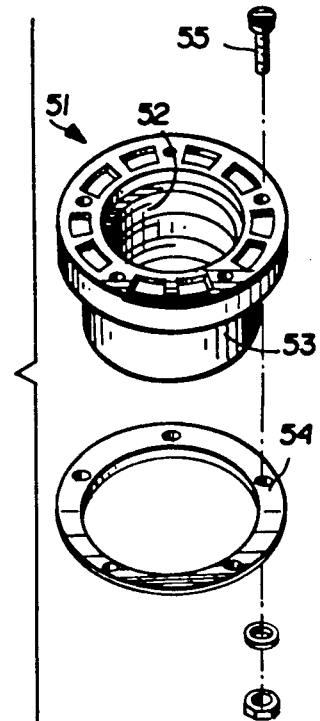
FIG. 5 is a top perspective view of an adaptor flange that may be utilized for mating the tank cap of FIG. 4 to a wide variety of different types of tanks.
Figure 6:
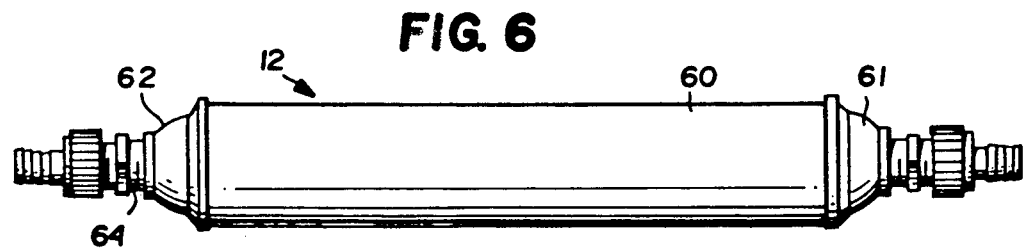
FIG. 6 is a side view of an exemplary odor filter utilized with the gas vent in the assembly of FIG. 1.

For tanks that do not have interiorally threaded openings in the top thereof, the adaptor flange 51 of FIG. 5 may be utilized. The flange 51 includes an interior internally threaded portion 52 and smooth, exterior collar 53, which can pass through the circular opening in the top of the tank 10. A gasket 54 is provided between the flange 51 and the top of tank, with fasteners 55 passing through aligned openings in the flange 51 and the gasket 54 for holding a structure onto the top of the tank.

Figure 7:
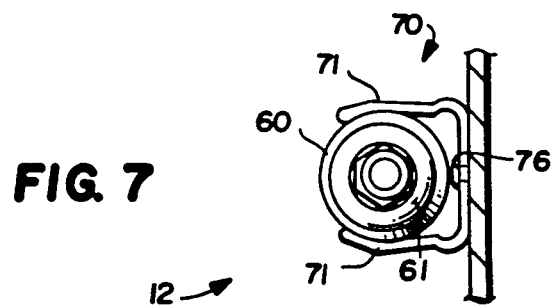
FIG. 7 is an end view of the odor filter of FIG. 6 in operative association with a mounting bracket.
Figure 8:
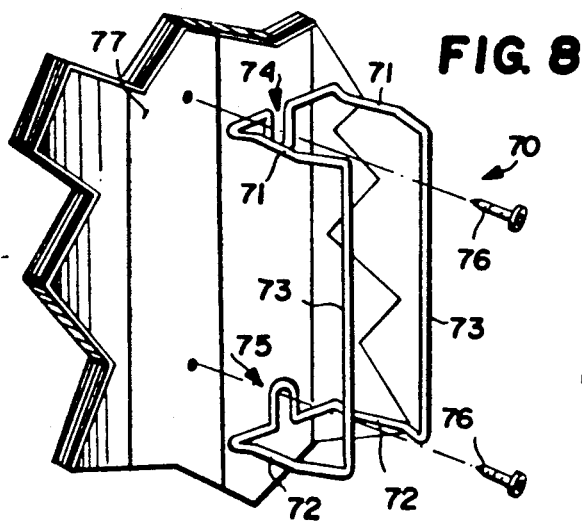
FIG. 8 is a top perspective view of the mounting bracket of FIG. 7.
Figure 9:
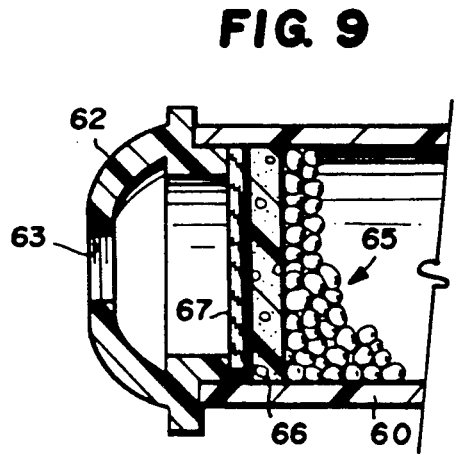
FIG. 9 is a partial side cross-sectional view of the tubular filter of FIG. 6.

The vent filter 12 is shown in detail in FIGS. 6 through 10, and includes a tubular housing 60 having PVC end caps 61, 62, respectively connected to the tank 10 and the hull vent fitting 26. Details of the PVC end cap 62 are illustrated in FIG. 9, cap 62 having interior ⅜" pipe threads 63, which are connectable to an exteriorally threaded connection 64 (see FIG. 6) for making connection to the conduit leading to fitting 26. The housing 60 typically would be elongated so that it had a length of about 14", with a minimum length of about 8", and the housing 60 preferably is of PVC pipe, with end caps 61, 62 solvent bonded thereto. The PVC pipe forming the housing 60 preferably has a diameter of about 1¼".

Figure 10:
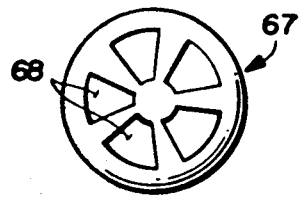
FIG. 10 is an end view of the retainer of the filter of FIG. 9.

Within the tubular housing 60 at each end thereof is a retaining means for holding activated carbon 65 (FIG. 9) within the housing. The retaining means comprises a piece of open-cell foam 66 which actually engages the activated carbon 65, and an apertured first, retaining polypropylene element 67. An end view of the element 67 is seen in FIG. 10, including the large apertures 68 therein. Preferably, the activated carbon 65 is composed of two different types, a first type, comprising a majority of the activated carbon (e.g., about 90%), which is particularly effective against hydrogen sulfide, and a second type, which is particularly effective against amino acid gaseous components. Both types may be purchased commercially from Calgon, or other sources. The housing 60 has sufficient cross-sectional area and the retaining means 66, 67 are constructed with sufficient porosity so that the filter 12 does not offer significant resistance to air flowing therethrough, but rather removes odors from the air before they are vented through fitting 26.

One particularly useful way that the housing 60 can be oriented and mounted for a wide variety of environments is by utilizing the bracket 70 illustrated in FIGS. 7 and 8. The bracket 70 preferably comprises an integral piece of wire having opposed side portions 71, 72, which are spaced apart from each other in a manner such that they are normally spaced apart a distance slightly less than the diameter of the housing 60, and therefore when the housing 60 is moved into contact therewith, they are deflected outwardly and clamp the housing in place, as illustrated in FIG. 7. The bracket 70 also includes elongated sections 73 connecting the side portions 71, 72, and fastener-receiving loop forming portions 74, 75 between the side portions 71, 72, respectively, for receiving screw fasteners 76 or the like to mount the bracket 70 to another surface, such as deck or bulkhead surface 77 (see FIG. 8).

Figure 11:
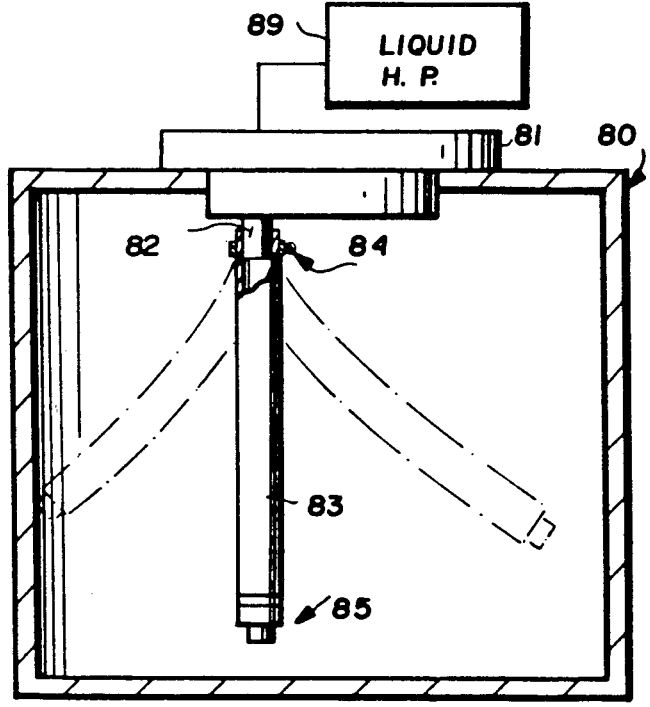
FIG. 11 is a side schematic cross-sectional view of a holding tank with a cleaning system as according to the present invention.
Figure 12:
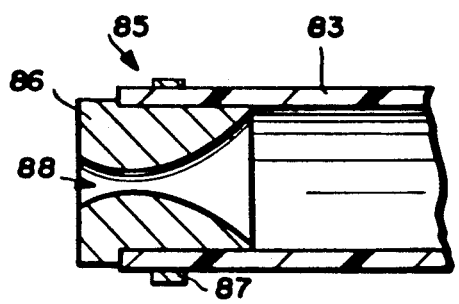
FIG. 12 is a side detailed cross-sectional view of the free end of the tubular cleaning element of FIG. 11.

It is also desirable, in order to effect maximum odor control, to be able to periodically clean out the holding tank. A tank or container interior cleaning system according to the invention is illustrated in FIGS. 11 and 12, shown in association with a tank or container 80 having interior walls including side walls, a bottom wall, and a top. Preferably, a cap 81, comparable to the tank cap 14, is disposed in the top wall of the container 80 and includes a hollow fitting 82 to which a flexible tube 83 is connected at a first end thereof using a conventional hose clamp 84. The flexible tube 83 also has a second, free end 85 thereof. The tube 84 may be formed of any flexible material, such as surgical tubing. At the second end 85 thereof, a nozzle is provided, indicated by reference numeral 86. The nozzle adds mass to the free end 85 of the tubing 83, and preferably is of metal, hard plastic, or the like. The nozzle is clamped solidly to the free end of the tube, as by barbs extending from the nozzle 86 into the tube material (not shown) and/or with a wire clamp 87. The nozzle 86 includes a flow restricting portion or orifice 88, which significantly restricts the flow of liquid through the nozzle 83, thereby increasing its velocity. The tubing 83 is connected, through cap 81, to a source 89 of liquid (e.g., a cleaning liquid) or other fluid under high pressure.

When liquid under high pressure is supplied to the interior of the tubing 83, tubing 83 thrashes wildly about the interior of the container 80 (as indicated in dotted line in FIG. 11), dispensing liquid throughout the interior of the container 80, with the nozzle 86 at the free end 85 thereof impacting at least the side walls of the container 80 to facilitate the cleaning action. Note that the hose 83 has sufficient length within the container 80 so that the nozzle 86 can impact at least the side walls of the container 80, and in fact it is desirable for the tube 83 (though not shown in FIG. 11) to have a length greater than the distance between the cap 81 and the bottom of the container 80.

It will thus be seen that according to the present invention an effective odor control system and procedure for toilet systems associated with vehicles (particularly boats, planes and trains or the like) is provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, methods, and devices.

What is claimed is:

1. A holding tank assembly for use with a toilet system for a vehicle, said tank assembly comprising:
   a holding tank having side walls, a bottom wall, and a top wall, an inlet for raw sewage, and an outlet for treat liquid;
   a source of deodorant chemical;
   a timer;
   a gas vent from aid top wall; and
   deodorant chemical injection means for injecting deodorant chemical from said source into said holding tank;
   said deodorant chemical injecting means for injecting a predetermined quantity of deodorant chemical into said tank at predetermined spaced time intervals, controlled by said timer, to minimize use of chemical while effectively controlling odors.

2. A holding tank assembly as recited in claim 1 wherein said deodorant chemical injection means comprises means for injecting a predetermined quantity of deodorant chemical into said holding tank every 24–72 hours.

3. A holding tank assembly as recited in claim 1 wherein said deodorant chemical injection means comprises means for injecting approximately 8 ounces of undiluted deodorant chemical into said holding tank approximately every 48 hours.

4. A holding tank assembly as recited in claim 1 comprising a tank cap disposed in said top of said holding tank and wherein said deodorant chemical injecting means comprises an injecting conduit extending through said tank cap from the exterior of said holding tank to the interior thereof.

5. A holding tank assembly as recited in claim 4 wherein said source of deodorant chemical is remote from said holding tank, and said deodorant chemical injection means further comprises an electrically operated chemical injecting pump located adjacent said source and operatively connected by a conduit to said tank cap.

6. A holding tank assembly as recited in claim 4 further comprising a vent comprising said gas vent, disposed in said tank cap and allowing the communication of gas from said holding tank to the exterior thereof.

7. A holding tank assembly as recited in claim 6 further comprising a conduit leading from said gas vent, and an odor filter disposed in said conduit.

8. A holding tank assembly as recited in claim 6 further comprising at least one level switch operatively mounted to said tank cap for sensing the level of liquid within said tank.

9. A holding tank assembly as recited in claim 1 wherein said deodorant chemical injecting means comprises means for injecting about 6–10 ounces of undiluted deodorant chemical into said holding tank every predetermined time interval.

10. A holding tank assembly as recited in claim 9 wherein said deodorant chemical injection means comprises means for injecting a predetermined quantity of deodorant chemical into said holding tank every 24-72 hours.

11. An odor filter for a vent from a holding tank for connection to a conduit from the holding tank vent comprising:
- a tubular housing;
- end termination means for said housing for connecting said housing to conduits;
- activated carbon filling said housing;
- retaining means adjacent each of said end terminations for maintaining said activated carbon in said housing;
- said housing having sufficient cross-sectional area, and said retaining means being constructed so that the filter does not offer significant resistance to air flowing therethrough; and
- a bracket for mounting said tubular housing to another component, said bracket comprising: an integral piece of wire having clamping side components normally spaced apart a distance slightly less than the diameter of said tubular housing, and engaging opposite sides of said tubular housing; elongated portions connecting said side clamping components and extending in the dimension of the elongation of said tubular housing; and looped fastener receiving portions extending between said side portions for receiving fasteners which hold said bracket onto a surface.

* * * * *